United States Patent
Autterson

[11] Patent Number: 5,827,589
[45] Date of Patent: Oct. 27, 1998

[54] STRAP DEVICES, AND METHODS OF CONSTRUCTING AND UTILIZING SAME

[76] Inventor: Christopher S. Autterson, 23669 W. Lebost, Novi, Mich. 48375

[21] Appl. No.: 642,157

[22] Filed: May 2, 1996

Related U.S. Application Data

[63] Continuation-in-part of Ser. No. 500,099, Jul. 10, 1995, abandoned.

[51] Int. Cl.$^6$ .................................................. B32B 3/02
[52] U.S. Cl. ......................... 428/40.1; 24/306; 24/442; 24/445; 24/447; 24/448; 24/450; 24/452; 428/40.9; 428/41.1; 428/41.7; 428/41.8; 428/192; 428/194
[58] Field of Search ................................. 428/40.1, 41.1, 428/41.7, 40.9, 41.8, 354, 192, 194, 195, 99, 100; 24/306, 442, 445, 447, 448, 450, 452

[56] References Cited

U.S. PATENT DOCUMENTS

| | | |
|---|---|---|
| 4,387,471 | 6/1983 | Hsu ........................................ 428/100 |
| 4,695,493 | 9/1987 | Friedlander ............................ 428/40.1 |
| 4,704,315 | 11/1987 | McClintock ........................... 428/40.1 |
| 4,706,914 | 11/1987 | Ground .................................. 428/100 |
| 4,770,913 | 9/1988 | Yamamoto ............................. 428/41.9 |
| 4,950,517 | 8/1990 | Loggins ................................. 428/40.1 |
| 5,378,522 | 1/1995 | Lagomarsino .......................... 428/100 |
| 5,518,795 | 5/1996 | Kennedy ................................ 428/100 |

*Primary Examiner*—Nasser Ahmad
*Attorney, Agent, or Firm*—Weiner & Burt, P.C.; Irving M. Weiner; Pamela S. Burt

[57] ABSTRACT

A strap to hold wires or other components permanently or semi-permanently, using a flexible high strength carrier member as the main component of the strap. The strap replaces mechanically retained wire clips. To apply the wire strap, first the back liner is removed and the adhesive or tape member is attached to a substrate. Then the main member is folded over the object to be held and is placed against adhesive, or a hook and loop fastener is employed.

5 Claims, 3 Drawing Sheets

STRAP DEVICES, AND METHODS OF CONSTRUCTING AND UTILIZING SAME

The present patent application is a continuation-in-part of U.S. patent application Ser. No. 08/500,099 filed Jul. 10, 1995, now abandoned, entitled "SELF-ADHESIVE WIRE STRAP, AND METHODS OF CONSTRUCTING AND UTILIZING SAME", the complete disclosure of which is incorporated herein by reference thereto.

BACKGROUND OF THE INVENTION

1. Field of the Invention

The present invention relates generally to strap devices for holding wires or other components permanently or semi-permanently using high strength material for the strap or harness. In particular, the present invention relates to self-adhesive wire straps, and wire straps employing hook and loop type fasteners, for holding wires or other components.

2. Description of the Relevant Art

The relevant art is exemplified by the following United States patents.

Erickson (Ende Company) U.S. Pat. No. 4,554,193, entitled "SUBSTRATE WITH DIFFERENTIAL ADHESION", discloses bonding means for achieving differential adhesion of articles such as picture frames, posters or other decorative items to wall surfaces and the like. The bonding device has adhesives secured to each of two major surfaces, with the adhesive having differential adhesion characteristics. A first adhesive is selected to achieve permanent bonding of the bonding means to the article to be displayed, with the second adhesive layer being an adhesive with low peel-low shear properties to permit removal from the wall surface whenever desired. The second adhesive provides semi-permanent positioning of the article being displayed, but permits removal thereof upon demand. The bonding means comprises a substrate with a first substantially permanent adhesive layer secured to one surface thereof, and with a co-extruded polyolefin-polyester film being bonded to the second surface thereof, and including a second adhesive layer applied to the polyester surface of the co-extruded film portion.

Yamamoto U.S. Pat. No. 4,770,913, entitled "BINDER", discloses improved binders or binding seals which have a substrate of a flexible material. At one end of the substrate is provided an ordinary adhesive layer, and at the other end is provided a peelable adhesive layer covered with an ordinary adhesive layer. The peelable adhesive layer allows the user to stick the end of the binder and peel it whenever desired. The binder may be formed with a hole or holes at one end to secure it to a file, and with a peelable adhesive layer at the other end so that a document can be stuck and peeled on and from it.

Waldenberger (Norton Company) U.S. Pat. No. 4,839,206, entitled "DOUBLE SIDED ADHESIVE TAPE", discloses a double-sided adhesive tape with a low surface energy adhesive on at least one side. The low surface energy adhesive has superior properties when the adhered is of the low surface energy type such as low surface energy acrylic paint, polyethylene, polytetrafluoroethylene and the like and the surface energy of the adhesive is lower than that of the adhered.

Arvidsson et al. (Intermall AB) U.S. Pat. No. 5,049,445, entitled "MASKING TAPE AND METHOD FOR MANUFACTURING ROLLS OF SUCH TAPE", discloses a masking tape, for example for spray-painting, comprising a strip of tearable material such as paper having an upper face and a lower face. A first pressure-sensitive adhesive layer covers the lower face of the strip from one side edge thereof to the opposite side edge. A second pressure-sensitive layer is applied to the upper face of the strip, and the second layer has a longitudinal extent co-extensive with that of the strip and a transverse extent less than half that of the strip and being positioned close to one edge of the strip. A release liner covers the second adhesive layer. The masking tape is to be fixed to a surface to be painted in such a position that the free-edge of the strip forms a border to the area to be painted. The release liner is removed and a masking paper is fixed to the adhesive layer and cut clean along the inner edge thereof. The masking tape is manufactured by laminating two tapes, one wider tape comprising a tearable strip with an adhesive layer on its lower face, and a narrower tape comprising a release liner and a releasable adhesive layer covering the lower face of the release liner, and being securely attached to the upper face of the wider tape.

Ness U.S. Pat. No. 5,130,185, entitled "DOUBLE SIDED PRESSURE SENSITIVE ADHESIVE", discloses a double-sided, pressure-sensitive, adhesive tape having a release paper on an adhesive surface. The release paper has a plurality of spaced-apart areas which have a lesser degree of adhesive to the adhesive surface than the remaining area of the release paper.

Madrzak et al. (J. M. Voith GmbH) U.S. Pat. No. 5,212,002, entitled "SPLICE AND PROCESS FOR MAKING A SPLICE ON THE LEADER OF A PAPER DOLL", discloses for making a web connection, an adhesive tape which essentially features on only one side an adhesive layer. The cover foil of this adhesive layer is comprised of two parts that are separated by a longitudinal seam. Applied on the other side of the substrate of the adhesive layer is at least one narrow adhesive strip, also having a cover foil, which preferably is contained on an edge of the adhesive tape.

None of the previous devices and techniques disclose or contemplate a self-adhesive strap or similar type strap using a hook and loop material for holding wires or other components permanently or semi-permanently using high strength material for the strap or harness. Indeed, a desideratum of the present invention is to avoid the animadversions of the previous devices and techniques. It would thus be desirable to provide a device which, in addition to eliminating the problems and disadvantages of the previous techniques, provides very new and desirable features, heretofore unattainable.

SUMMARY OF THE INVENTION

The present invention provides a strap device for at least partially limiting movement of an object relative to an external member. The device comprises a strap member having a first predetermined major surface on one side thereof, and a second predetermined surface on a side opposite to said one side. First securement means is disposed on only a predetermined portion of the first predetermined major surface of the strap member for securing the strap device to the external member. Second securement means is disposed on at least a first predetermined portion of the second predetermined major surface of the strap member for at least partially limiting movement of the object relative to the strap member. The strap member is flexible to at least partially surround the object, to bring the second securement means into an operative securement position for at least partially limiting movement of the object relative to the strap member, and to bring the first predetermined portion of the second predetermined major surface adjacent a second predetermined portion of the second predetermined major surface so that the first and second predetermined portions are separated by distance no greater than the thickness of the second securement means, and to thereby at least partially limit movement on the object relative to the external member.

It is an object of the invention to provide a self-adhesive wire strap wherein the main strap member is fabricated from at least one metal, such as aluminum.

Another object of the invention is to provide a self-adhesive wire strap wherein the main strap member is fabricated from polyvinyl chloride (PVC).

A further object of the invention is to provide a wire strap which includes foam tape for improved adhesion to heavily textured surfaces.

Another object of the invention is to provide a wire strap wherein the main strap member is fabricated from aluminum foil or a polyester film.

A further object of the invention is to provide a wire or tubing strap wherein the main strap member is fabricated from PVC film with a hook and loop type fastener for reusability in office, home and medical applications.

Other objects, advantages and applications of the present invention will become apparent to those skilled in the art when the accompanying description of the best modes contemplated for practicing invention is read in conjunction with the accompanying drawings.

BRIEF DESCRIPTION OF THE DRAWINGS

The description herein makes references to the accompanying drawings wherein like reference numerals refer to like or equivalent parts, and in which.

DESCRIPTION OF SOME PREFERRED EMBODIMENTS

Figure 1:
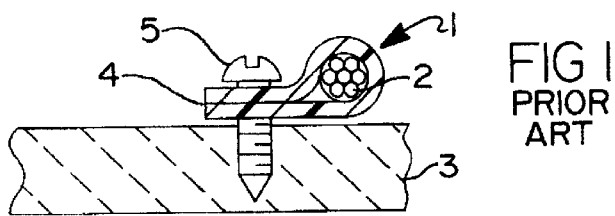
FIG. 1 illustrates a prior art technique for securing a wire or cable to a substrate.

Referring to FIG. 1, there is illustrated a prior art device 1 for securing a wire or cable 2 to an external object or substrate 3, such as a wall, beam, automotive interior, boat interior, trailer interior, etc. The prior art technique involves an expensive wire clip or strap 4, which may be formed of plastic or metal. The clip 4 holds or encircles the wire or cable 2 to be secured to the external substrate 3. A conventional fastener, such as a screw 5 passes through two ends of the clip 4 to secure the device 1 to an external substrate or wall 3.

FIGS. 2–5 illustrate a first embodiment of the present invention.

Figure 2:
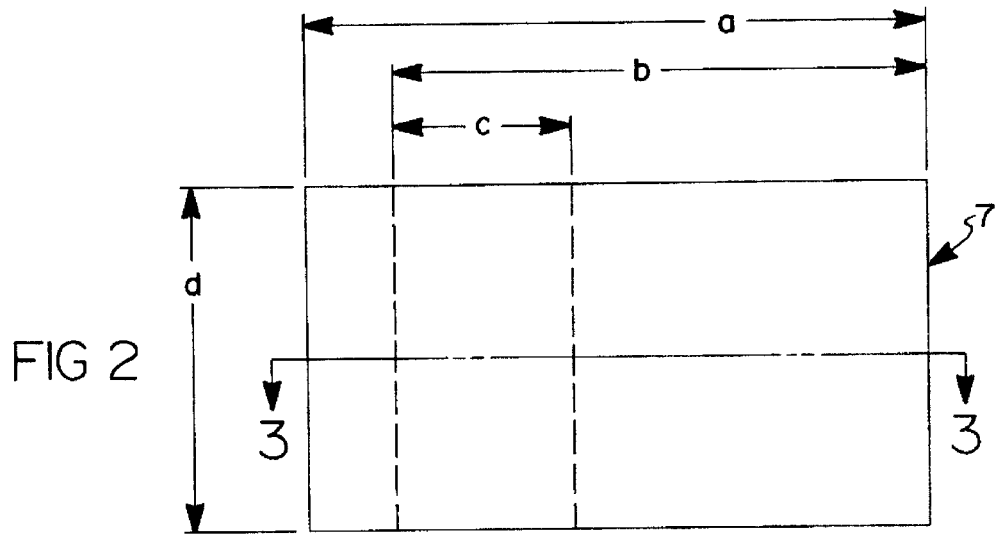
FIG. 2 illustrates a top plan view of a self-adhesive device according to one embodiment of the present invention.

FIG. 2 illustrates a top plan view of a self-adhesive device 7 it has been placed in use to secure an object 8 to an external member 9. The dimensions a, b, c, and d as shown in FIG. 2 may be any appropriate or suitable dimensions to accommodate the particular application of use of the device 7. In a first embodiment of the invention, the dimension a may preferably, but not necessarily, be approximately 89 millimeters; the dimension b may preferably, but not necessarily be approximately 76 millimeters; the dimensions c may preferably, but not necessarily, be approximately 25 millimeters; and the dimension d may preferably, but not necessarily, be approximately 25 millimeters.

Figure 3:
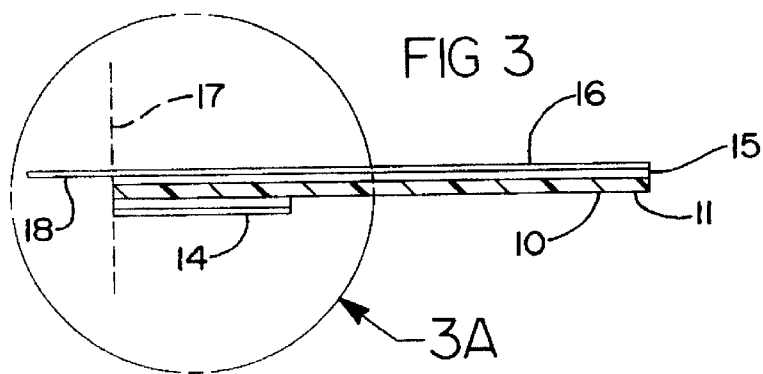
FIG. 3 depicts a sectional view of the FIG. 2 device taken along the line 3—3.
Figure 3A:
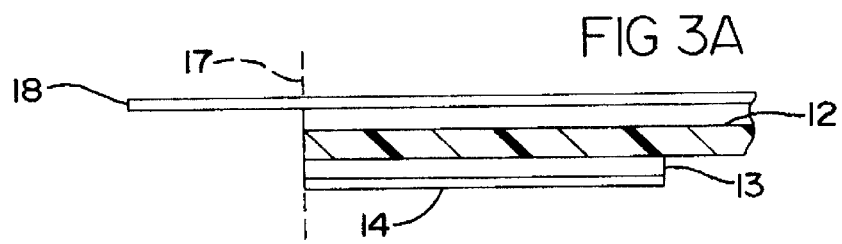
FIG. 3A illustrates in an enlarged fashion a portion of the inventive device as circled in phantom line in FIG. 3.

FIG. 3 illustrates a cross-sectional elevational view of the self-adhesive device 7 taken along the line 3—3 in FIG. 2. FIG. 3A shows an exploded portion of the FIG. 3 configuration. The self-adhesive device or strap 7 includes a carrier member 10 having a first predetermined elongated major surface 11 on one side thereof, and a second predetermined elongated major surface 12 on a side opposite to said one side. A first predetermined quantity and configuration of adhesive 13 is disposed on a predetermined portion of the first predetermined elongated major surface of the carrier member 10.

A first release liner 14 is releasibly disposed on the first predetermined quantity and configuration of adhesive 13. A second predetermined quantity and configuration of adhesive 15 is disposed on a predetermined portion of the second predetermined elongated major surface 12 of the carrier member 10.

A second release liner 16 is releasibly disposed on the second predetermined quantity and configuration of adhesive 15.

Preferably, but not necessarily, the carrier member 10, the first predetermined quantity and configuration of adhesive 13, the first release liner 14, and the second predetermined quantity and configuration of adhesive 15 to terminate in a common plane 17 as indicated in FIGS. 3 and 3A.

The first release liner 14 is removable to expose the first predetermined quantity and configuration of adhesive 13. After the first release liner 14 is removed, the strap 7 is pressed against the external member 9 so that the first predetermined quantity and configuration of adhesive 13 may secure the strap 7 to the external member 9. The second release liner 16 is then removed to expose the second predetermined quantity and configuration of adhesive 15. The self-adhesive strap 7 is shown in FIG. 4 secured to the external member 9 with the second release liner 16 removed.

To facilitate removal of the second release liner 16, the second release liner 16 is provided with an exposed tab 18 as illustrated at the extreme left-hand portion of FIG. 3 and FIG. 3A. This enables the user to easily grasp the second release liner 16 for removing it from the second predetermined quantity and configuration of adhesive 15.

Figure 4:
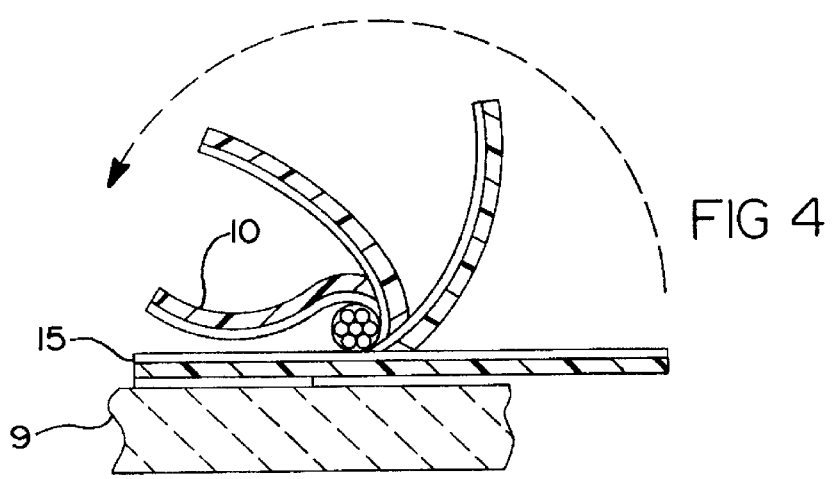
FIG. 4 illustrates the inventive device as it is being folded over the wire cable.
Figure 5:
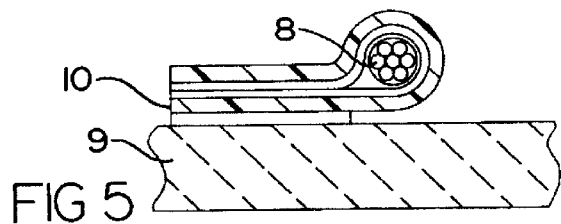
FIG. 5 illustrates the inventive device in its final form permanently affixing the wire cable to an external substrate.

As illustrated in FIG. 4, the carrier member 10 together with the second predetermined quantity and configuration of adhesive 15 is folded over the object, such as a wire 8, which is to be secured to the external member 9. As shown in FIGS. 4 and 5, the strap 7 is folded over against itself and pushed together, adhesive to adhesive, to form an extremely secure bond.

FIG. 5 illustrates the self-adhesive strap 7 in its final position securing the wire 8 to an external member, such as a wall or other substrate 9.

The carrier member 10 preferably, but not necessarily, is fabricated from a polypropylene, a polyester, or a metallic foil, such as, for example, aluminum foil.

It should be apparent to a person skilled in the art that the present invention readily serves the same purpose as conventional wire harnesses in the form of injection molded clips. However, the self-adhesive strap 7 of the present invention readily accommodates various types and sizes of wire 8, without having to resort to a supply of different sized injection molded wire harnesses 4. Furthermore, because the present invention does not require conventional fastening elements 5, such as screws or rivets, it can be more easily applied to inconveniently located substrates 9.

At least a portion of the second predetermined quantity and configuration of adhesive 15 adheres to the wire 8 as part of the permanent connection preventing the wire 8 from slipping or moving.

The first embodiment preferably, but not necessarily, includes a flexible, substantially high strength carrier member 10 having opposed major surfaces with preferably different portions of adhesive thereon.

Figure 6:
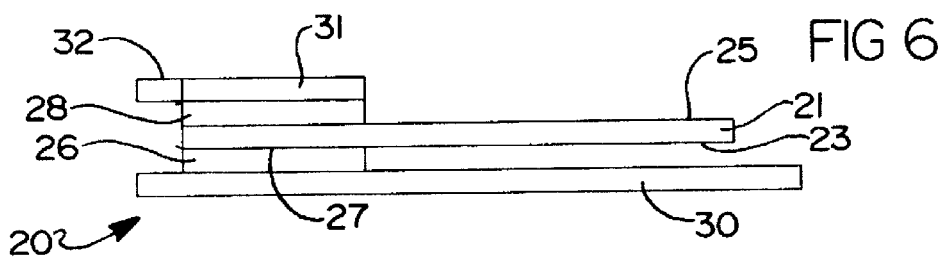
FIG. 6 illustrates a cross-sectional view of a second embodiment of the present invention.

Referring to FIG. 6, there is illustrated a strap device according to a second embodiment of the present invention. The device 20 includes a strap member 21 having a first predetermined major surface on one side 23 thereof, and a second predetermined major surface on a side 25 opposite to said one side 23. The strap member 21 is flexible to at least partially surround an object (not shown), external m wire, cable, tubing, etc., relative to an external member or substrate (not shown), such as a wall, substrate or other structural component.

Preferably, but not necessarily, the strap member 21 may comprise a flexible film fabricated from a material selected from a group comprising a metallic foil, a polyester film, a polyvinyl chloride film, a urethane film, and a woven polypropylene.

First securement means, such as an adhesive layer 26, is disposed on only a predetermined portion 27 of the first predetermined major surface of the strap member 21 for securing the strap device 20 to an external member or substrate (not shown).

Second securement means, such as an adhesive layer 28, is disposed on at least a first predetermined portion of the second predetermined major surface of the strap member 21 for at least partially limiting movement of the object (not shown) relative to the strap member 21.

Each strap device 20 may be provided with a release liner 30, or alternatively a plurality of such strap devices 20 may employ a common release liner 30.

The adhesive layer 28 may also be provided with a release liner 31 having a tab 32 to facilitate removal from the adhesive layer 28.

Figure 7:
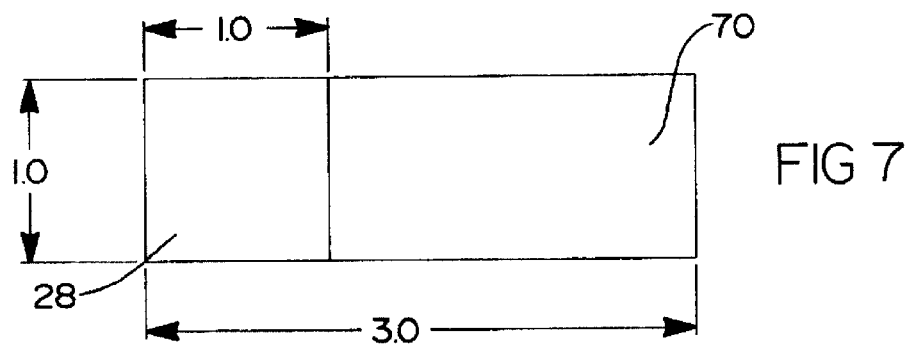
FIG. 7 depicts a top plan view of the second embodiment illustrated in FIG. 6 with release liner 30 and 31 removed for clarity.

As compared to the first embodiment shown in FIGS. 2–5, the second embodiment shown in FIGS. 6 and 7 has the adhesive reduced by ⅓ on the top fold over portion 70.

Preferably, but not necessarily, the strap member may be 0.004 inches thick aluminum, or 8 to 12 mil thick PVC film. The right-hand portion 70 of strap member 21 as viewed in FIGS. 6 and 7 is folded over the wires or other objects to be held and adhered to adhesive layer 28. Informal testing has shown that the bond between the adhesive layer 28 and the aluminum strap member 21 in the fold over position is more resistant to separation or tenting than an adhesive to adhesive bond in some extreme cases, such as under heavy vertical pull of one pound or more. It should be noted that when the strap member 21 is folded over and adhered to adhesive layer 28, the first and second predetermined portions are separated by a distance no greater than the thickness of the second securement means, adhesive layer 28.

Figure 8:
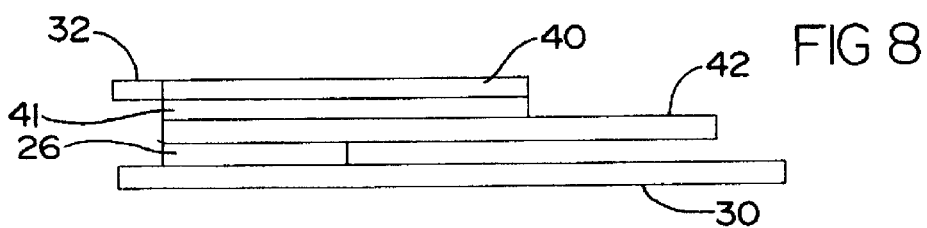
FIG. 8 illustrates a cross-sectional view of a third embodiment according to the present invention.
Figure 9:
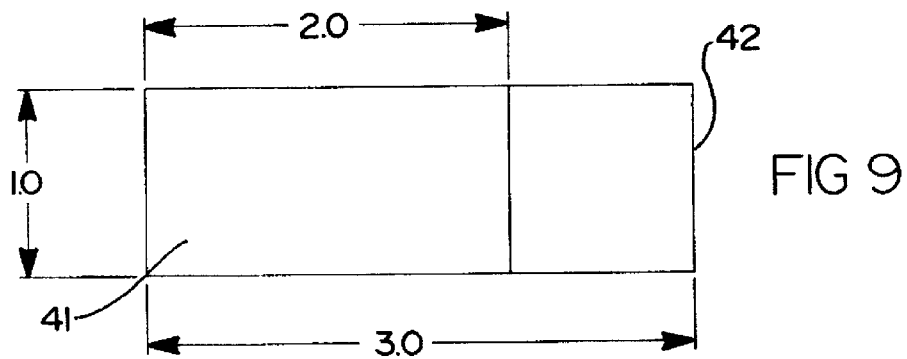
FIG. 9 depicts a top plan view of the third embodiment is illustrated in FIG. 8 with release liner 40 and 30 removed for clarity.

The third embodiment of the invention shown in FIGS. 8 and 9 is similar to the second embodiment except for the fact that the top release liner 40 and its contiguous adhesive layer 41 is ⅔ of the dimension of the main strap member 42. Preferably, but not necessarily, the strap member 42 of the third embodiment is 0.012 inches thick PVC or 0.004 inches thick aluminum. Informal testing has shown that the bond between the adhesive 41 and the aluminum in the fold over position is more resistant to separation or tenting than an adhesive to adhesive bond in some extreme cases, usually under a heavy vertical pull of one pound or more and high temperatures of 180° F. or more.

Figure 10:
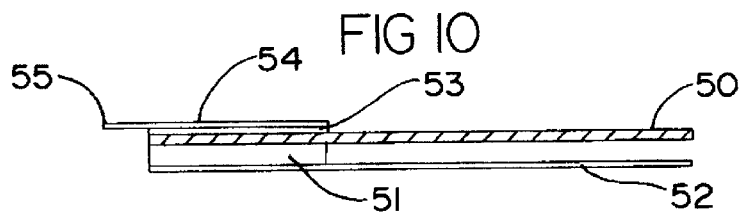
FIG. 10 illustrates a cross-sectional view of a fourth embodiment of the present invention.

FIG. 10 shows a fourth embodiment of the invention wherein the main strap member 50 preferably, but not necessarily, is comprised of PVC film which is 0.008 inches to 0.012 inches thick, or alternatively of aluminum foil or polyester film. Disposed under the main strap member 50 is a foam tape member 51 which is preferably, not necessarily, 0.032 inches to 0.062 inches thick for adhesion to heavily textured surfaces. Beneath the foam tape member 51 is a liner paper or a carrier sheet 52.

Disposed on top of the main strap member 50 is an adhesive layer 53 which preferably, but not necessarily, is 0.005 to 0.008 inches thick. Disposed on top of the adhesive layer 53 is a liner 54 with a tab 55.

The fourth embodiment shown in FIG. 10 has particular use for improved adhesion to a heavily textured surfaces, such as fiberglass members.

Figure 11:
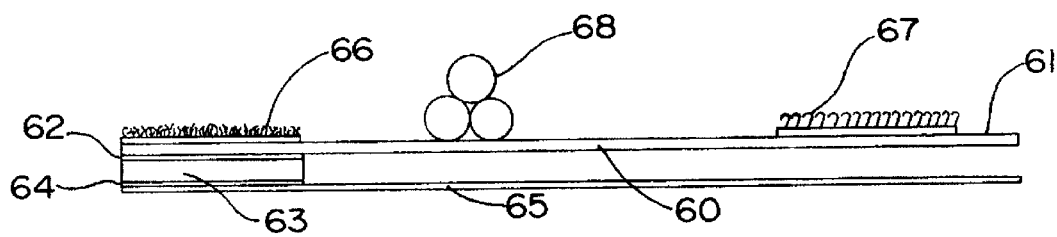
FIG. 11 depicts a cross-sectional view of a fifth embodiment of the present invention.

FIG. 11 shows a fifth embodiment of the invention wherein the main strap member 60 is preferably, but not necessarily, formed of 8 to 12 mils thick PVC film. The main strap member 60 is also provided with an extended film tab 61.

Disposed beneath the main strap member 60 is a layer 62 of permanent adhesive which is sandwiched between the main strap member 60 and a foam tape member 63. Preferably, but not necessarily, the foam tape member 63 is 0.032 inches to 0.062 inches thick. The foam tape member 63 is permanently bonded to the main strap member 60.

On the opposite side of the foam tape member 63 is a layer 64 of removable or permanent adhesive for securing the device to a paper liner 65.

Disposed on top of the main strap member 60 is a portion having loop (or hook) material 66 for mating with another portion having hook (or loop) material 67, respectively. The wires or tubing 68 to be secured by the device are shown in FIG. 11.

The PVC film strap 60 with a hook and loop tie fastener 66 and 67 as shown in FIG. 11 is designed preferably, but not necessarily, for reusability and for use in office, home and medical applications. One purpose is to hold tubing or wires 68 temporarily or permanently. Possible suggested uses include holding IV lines and monitor leads for hospital use, and for office equipment and computer cables where free movement of cables and equipment is required.

A preferable size for the fifth embodiment is 1 inch wide by 5.5 inches, 4.5 inches or 3.5 inches long to accommodate multiple size wires or tubes 68.

Preferably, but not necessarily, the adhesive used for layers 13, 15, 26, 28, 41, 53 and 64 is an adhesive known as TESA4965.

While the foregoing has described the features and advantages of several embodiments of the present invention, it will be apparent to those skilled in the art that changes in form, dimensions, materials and proportions, and minor details of construction may be resorted to without departing from the spirit of the invention or the scope of the appended claims.

I claim:

1. A strap device at least partially limiting movement of an object relative to an external member, comprising, in combination:

a strap member having a first predetermined major surface on one side thereof, and a second predetermined major surface on a side opposite said one side;

said strap member comprising a flexible film fabricated from a material selected from a group comprising a metallic foil, a polyester film, a polyvinyl chloride film, a urethane film, and a woven polypropylene;

first securement means disposed on only a predetermined portion of said first predetermined major surface of said strap member securing said strap device to said external member;

second securement means comprises adhesive which is disposed directly on one first predetermined portion of only said second predetermined major surface of said strap member at least partially limiting movement of said object relative to said strap member, said first predetermined portion consists of a minor portion of said second predetermined major surface; and said strap member being flexible to bring said first predetermined portion of said second predetermined major surface adjacent to a second portion of said second predetermined major surface so that first and second portions of said second predetermined major surface are separated by a distance no greater than the thickness of said second securement means, and thereby at least partially limiting movement of said object relative to said external member.

2. A device according to claim 1, wherein:

said first securement means comprises adhesive.

3. A device according to claim 1, wherein:

said first securement means comprises foam tape.

4. A device according to claim 1, wherein:

said first securement means comprises hook or loop material.

5. A strap device at least partially limiting movement of an object relative to an external member, comprising, in combination:

a strap member having a first predetermined major surface on one side thereof, and a second predetermined major surface on a side opposite to said one side;

said strap member comprising a flexible film fabricated from a material selected from a group comprising a metallic foil, a polyester film, a polyvinyl chloride film, a urethane film, and a woven polypropylene;

first securement means disposed on only a portion of said first predetermined major surface of said strap member securing said strap device to said external member;

second securement means disposed directly on only two spaced apart predetermined portions of only said second predetermined major surface of said strap member at least partially limiting movement of said object relative to said strap member, each of said two predetermined portions consist of a minor portion of said second predetermined major surface; and said strap member being flexible to bring said two predetermined portions of said second predetermined major surface of said strap member adjacent to one another and facing one another with opposite ends of said second predetermined major surface facing one another so that said two predetermined portions are separated by a distance no greater than said thickness of said second securement means, and thereby at least partially limiting movement of said object relative to said external member.

* * * * *